US 6,747,924 B1

(12) United States Patent
Muramatsu

(10) Patent No.: US 6,747,924 B1
(45) Date of Patent: Jun. 8, 2004

(54) OPTICAL DISK REPRODUCTION APPARATUS

(75) Inventor: Akihiro Muramatsu, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 410 days.

(21) Appl. No.: 09/694,904

(22) Filed: Oct. 24, 2000

(30) Foreign Application Priority Data

Oct. 29, 1999 (JP) .......................................... 11-307914

(51) Int. Cl.[7] .............................. G11B 7/00; G11B 7/09
(52) U.S. Cl. .............................. 369/44.29; 369/47.17; 369/53.1; 369/53.18
(58) Field of Search ........................ 369/44.29, 124.11, 369/47.39, 53.11, 44.28, 44.35, 44.11, 44.26, 53.2, 53.28, 47.17, 53.1, 53.18

(56) References Cited

U.S. PATENT DOCUMENTS 5,671,201 A * 9/1997 Yokota et al. ............. 369/47.39
5,848,036 A * 12/1998 Ishibashi et al. .......... 369/44.29
6,172,959 B1 * 1/2001 Sano et al. ............. 369/124.11

* cited by examiner

Primary Examiner—William Korzuch
Assistant Examiner—Kim-Kwok Chu
(74) Attorney, Agent, or Firm—Pillsbury Winthrop LLP

(57) ABSTRACT

Prior to actual reproduction of an optical disk, test reproduction is performed with respect to a plurality of testing radial locations of the optical disk. In the test reproduction, waveform-equalization-characteristic parameters of the waveform equalization section are adjusted to optimal settings so as to optimize jitter of a reproduced RF signal detected at each of the testing radial locations of the optical disk. In the actual reproduction of the optical disk, the waveform-equalization-characteristic parameters of the waveform equalization section are adjusted to optimal settings that are predicted, from the optimal settings determined by the test reproduction, in accordance with a radial position or address, on the optical disk, of each location to be reproduced.

10 Claims, 6 Drawing Sheets

OPTICAL DISK REPRODUCTION APPARATUS

BACKGROUND OF THE INVENTION

The present invention relates generally to optical disk reproduction apparatus such as DVD (Digital Versatile Disk) players, and more particularly to an improved optical disk reproduction apparatus which is capable of high-quality reproduction of recorded information at each individual radial position of an optical disk with minimized errors without undesirably suspending the reproduction.

On DVDs and some other types of optical disks, information is recorded using the so-called "mark length recording scheme". In a reproduced RF signal waveform output from an optical pickup reading out the information recorded with such a mark length recording scheme, higher-frequency components (i.e., signals of smaller pulse widths) would present lower signal levels. Thus, if each reproduced RF signal from the optical pickup is input into a slicer and binarized thereby, as it is, using a predetermined slice level, great jitter tend to occur, thus resulting in many errors. For this reason, it has been conventional to first input the reproduced RF signal into a waveform equalization circuit so that the reproduced RF signal is binarized by the slicer with the levels of the higher-frequency components raised to a predetermined degree, to thereby reduce the undesired jitter. Further, some of the conventional DVD players contain a jitter detection circuit, and performs test reproduction of the optical disk with respect to an innermost location of the optical disk prior to actual or non-test reproduction of the disk. Through the test reproduction, waveform equalization characteristics of the waveform equalization circuit are adjusted to optimize (e.g., minimize) the jitter level by the jitter detection circuit. During the subsequent actual reproduction, the recorded information on the entire optical disk is reproduced with the waveform equalization characteristics fixed at the adjusted values or settings.

Among various schemes for reproducing a DVD or other type of optical disk with information recorded at a constant linear velocity is one which can reproduce the recorded information at high speed by rotating the optical disk at a constant angular velocity and eliminate a need for variably controlling the rotating speed in accordance with a radial position or address, on the optical disk, of each location to be reproduced via the optical pickup (i.e., a radial position traversed by the optical pickup). In such constant-angular-velocity reproduction of the optical disk with information recorded at a constant linear velocity (i.e., CLV optical disk), the data transfer rate differs between the inner and outer regions of the optical disk—the difference in the data transfer rate is normally compensated for by a buffer memory—, so that there would occur great variations in the amplitudes of the high-frequency components of the reproduced RF signal waveform (particularly, the amplitude of 3T-pit signals in the DVD case). Thus, with the conventionally-known technique of adjusting the waveform equalization characteristics of the waveform equalization circuit through the test reproduction performed with respect to innermost location of the optical disk and then fixedly using the thus-adjusted waveform equalization characteristics, there would be countered the problem that the jitter increase as the reproduction proceeds toward the outer circumferential region of the disk.

Further, if the optical disk has a warp, the reproducing laser light would get out of focus, which would also lead to an increased jitter level. To reduce the jitter caused by the disk warp, it is generally effective to perform focus adjustment, such as focus balance adjustment or focus error adjustment, and also adjust the waveform equalization characteristics of the waveform equalization circuit. However, because the disk warp, if any, generally becomes greater in the inner-to-outer direction of the optical disk, the conventionally-known technique of adjusting the waveform equalization characteristics of the waveform equalization circuit through the test reproduction with respect to innermost location and then fixedly using the adjusted waveform equalization characteristics would present the problem the jitter level increases as the reproduction proceeds toward the outer circumferential region of the disk.

One possible solution to the above-mentioned jitter problem in the case where the CLV optical disk is reproduced at a constant angular velocity or where a warped disk is reproduced may be to perform the focus adjustment and waveform equalization characteristic adjustment, on a real-time basis, by detecting the jitter while the optical disk is being read via the optical pickup. However, because the focus adjustment and waveform equalization characteristic adjustment is each one form of control for finding optimum values or settings capable of providing an optimal (e.g., minimal) jitter level while variously changing the settings, it unavoidably passes, during the course of the adjustment, some locations where the jitter level is unsatisfactory, with the result that the real-time adjustment can not be performed appropriately while allowing the optical disk to be read via the optical pickup without suspension.

SUMMARY OF THE INVENTION

In view of the foregoing, it is an object of the present invention to provide an improved optical disk reproduction apparatus which, even where a constant-liner-velocity (CLV) disk is to be reproduced at a constant angular velocity or a warped disk is to be reproduced, is capable of high-quality reproduction of recorded information from the optical disk by modifying focus adjustment or waveform equalization characteristic adjustment to optimal settings, without suspending the reproduction, so as to achieve an optimum jitter level at each individual radial position of the disk.

To accomplish the above-mentioned object, the present invention provides an optical disk reproduction apparatus which comprises: an optical pickup arranged to read out recorded information from an optical disk; a waveform equalization section arranged to perform a waveform equalization process on a reproduced RF signal that is generated on the basis of the recorded information read out by the optical pickup; a jitter detection section arranged to detect jitter of the reproduced RF signal having been subjected to the waveform equalization process; and a control section. The control section is arranged to perform test reproduction of the optical disk with respect to a plurality of testing radial locations of the optical disk prior to actual reproduction of the optical disk, adjust a waveform equalization characteristic of the waveform equalization section to an optimal setting so as to optimize the jitter of the reproduced RF signal detected by the jitter detection section at each of the testing radial locations of the optical disk, and during the actual reproduction of the optical disk, adjust the waveform equalization characteristic of the waveform equalization section to an optimal setting that is predicted, from the optimal setting determined by the test reproduction, in accordance with a changing radial position of the optical disk to be reproduced via the optical pickup. In the present invention, an optimal setting of the waveform equalization characteristic is predicted and set, for each radial position of the optical disk, on the basis of the optimal setting determined by the test reproduction, and thus there can always be provided an optimal waveform equalization characteristic, for each radial position of the optical disk, capable of optimizing (e.g., minimizing) the jitter, without suspending the reproduction.

The optical disk reproduction apparatus of the present invention further comprises a focus adjustment section arranged to perform a focus adjustment process for adjusting either one or both of a focus balance and focus offset by use of two focus-error-detecting signals generated on the basis of the recorded information read out by the optical pickup. In this case, the control section, during the test reproduction, adjusts the focus adjustment section to an optimal setting at each of the testing radial locations, prior to adjustment of the waveform equalization characteristic, so as to optimize the jitter of the reproduced RF signal detected by the jitter detection section. During the actual reproduction, the control section performs further control to adjust the focus adjustment section to an optimal setting that is predicted, from the optimal setting determined by the test reproduction, in accordance with a radial position or address, on the optical disk, of each location to be reproduced via the optical pickup. Thus, if the optical disk has a radial warp, it can be reproduced appropriately with optimized (e.g., minimized) jitter at each radial location thereof. In this case, the control section may store, into a memory, the optimal setting of the focus adjustment section determined by the test reproduction, and during the actual reproduction, the control section may arithmetically predict an optimal setting of the focus adjustment section, on the basis of the optimal setting of the focus adjustment section stored in the memory, in accordance with the radial position, on the optical disk, of each reproduced location.

Whereas the above-mentioned inventive optical disk reproduction apparatus can be advantageously applied particularly to a case where an optical disk of a type having information recorded at a constant linear velocity is reproduced at a constant angular velocity, it can also be suitably applied to other cases, such as where an optical disk of a type having information recorded at a constant linear velocity is reproduced at a constant linear velocity, to permit appropriate reproduction without being adversely influenced by a warp etc. of the optical disk.

According another aspect of the present invention, there is provided an optical disk reproduction apparatus which comprises: a rotation control arranged to drive an optical disk, having information recorded at a constant linear velocity, at a constant angular velocity; an optical pickup arranged to read out recorded information from the optical disk; a waveform equalization section arranged to perform a waveform equalization process on a reproduced RF signal that is generated on the basis of the recorded information read out by the optical pickup; a jitter detection section arranged to detect jitter of the reproduced RF signal having been subjected to the waveform equalization process; and a control section. The control section performs test reproduction of the optical disk with respect to a single testing radial location of the optical disk prior to actual reproduction of the optical disk, adjusts a waveform equalization characteristic of the waveform equalization section to an optimal setting so as to optimize jitter of a reproduced RF signal detected by the jitter detection section at the single testing radial location, and during the actual reproduction of the optical disk, adjusts the waveform equalization characteristic of the waveform equalization section to an optimal setting that is predicted, on the basis of a variation, in the linear velocity, relative to the testing radial location, in accordance with a radial position, on the optical disk, of each location to be reproduced via the optical pickup. In the case where an optical disk of a type having information recorded at a constant linear velocity is reproduced at a constant angular velocity, an optimal setting of the waveform equalization characteristic is predicted and set, for each radial position of the optical disk, on the basis of the optimal setting determined by the test reproduction, and thus there can always be provided an optimal waveform equalization characteristic, for each radial position of the optical disk, capable of optimizing (e.g., minimizing) the jitter. Further, because the test reproduction is performed with respect to only one predetermined testing radial location, such as the innermost or near-innermost location, of the optical disk, the present invention can significantly reduce the time required for the test reproduction.

In the above-mentioned invention, the control section may store, into a memory, the optimal setting of the waveform equalization characteristic determined by the test reproduction so that during the actual reproduction, the control section can arithmetically predict an optimal setting of the waveform equalization characteristic, on the basis of the optimal setting of the waveform equalization characteristic stored in the memory, in accordance with the radial position, on the optical disk, of each reproduced location.

According to still another aspect of the present invention, there is provided an optical disk reproduction apparatus which comprises: an optical pickup arranged to read out recorded information from an optical disk; a waveform equalization section arranged to perform a waveform equalization process on a reproduced RF signal that is generated on the basis of the recorded information read out by the optical pickup; a demodulation section arranged to demodulate the reproduced RF signal having been subjected to the waveform equalization process, while cumulatively storing the reproduced RF signal into a buffer memory; a jitter detection section arranged to detect jitter of the reproduced RF signal having been subjected to the waveform equalization process; a focus servo control section arranged to perform focus servo control by detecting a focus error on the basis of two focus-error-detecting signals that are generated on the basis of the recorded information read out by the optical pickup; a focus adjustment section arranged to perform a focus adjustment process for adjusting either one or both of a focus balance and focus offset by use of the two focus-error-detecting signals; a low-frequency-component detection section arranged to detect a low-frequency component in a focus drive signal produced by the focus servo control section; and a control section. When it is determined that the low-frequency component in the focus drive signal has exceeded a predetermined threshold value or a difference in the low-frequency component in the focus drive signal between an innermost location and a reproduced location of the optical disk has exceeded a predetermined threshold value and/or the jitter of the reproduced RF signal has exceeded a predetermined threshold value and also on condition that more than a predetermined quantity of data are currently being stored in the buffer memory, the control section suspends the readout operation of the optical pickup and adjusts the focus adjustment section so as to optimize the jitter of the reproduced RF signal detected by the jitter reproduction section. Then, the control section resumes the readout operation of the optical pickup after the adjustment to the focus adjustment section. Because the control section makes the jitter adjustment by suspending the readout operation of the optical pickup when the low-frequency component in the focus drive signal (corresponding to a warp of the optical disk) or the jitter level has become excessive and on condition that more than a predetermined quantity of data are currently being stored in the buffer memory, the inventive optical reproduction apparatus can appropriately reproduce even a warped optical disk with the jitter level optimized while maintaining the continuity of the reproduction.

In this case, the control section may perform control, after the adjustment to the focus adjustment section, to adjust the waveform equalization characteristic to an optimal setting so as to optimize the jitter of the reproduced RF signal detected by the jitter reproduction section and then may perform further control to resume the readout operation of the optical pickup after the adjustment of the waveform equalization characteristic. Further, the control section may perform control to suspend the above-mentioned adjustment when a predetermined cause for suspending the adjustment occurs during the course of the adjustment, and then may resume the readout operation of the optical pickup by returning to a previous setting that was being used prior to the adjustment. Thus, in a situation where the buffer memory gets empty due to some reason so that the continuity of the reproduction can not be maintained any longer, for example, it is possible to keep the continuity of the reproduction by suspending the adjustment operation.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Embodiment 1

Figure 1:
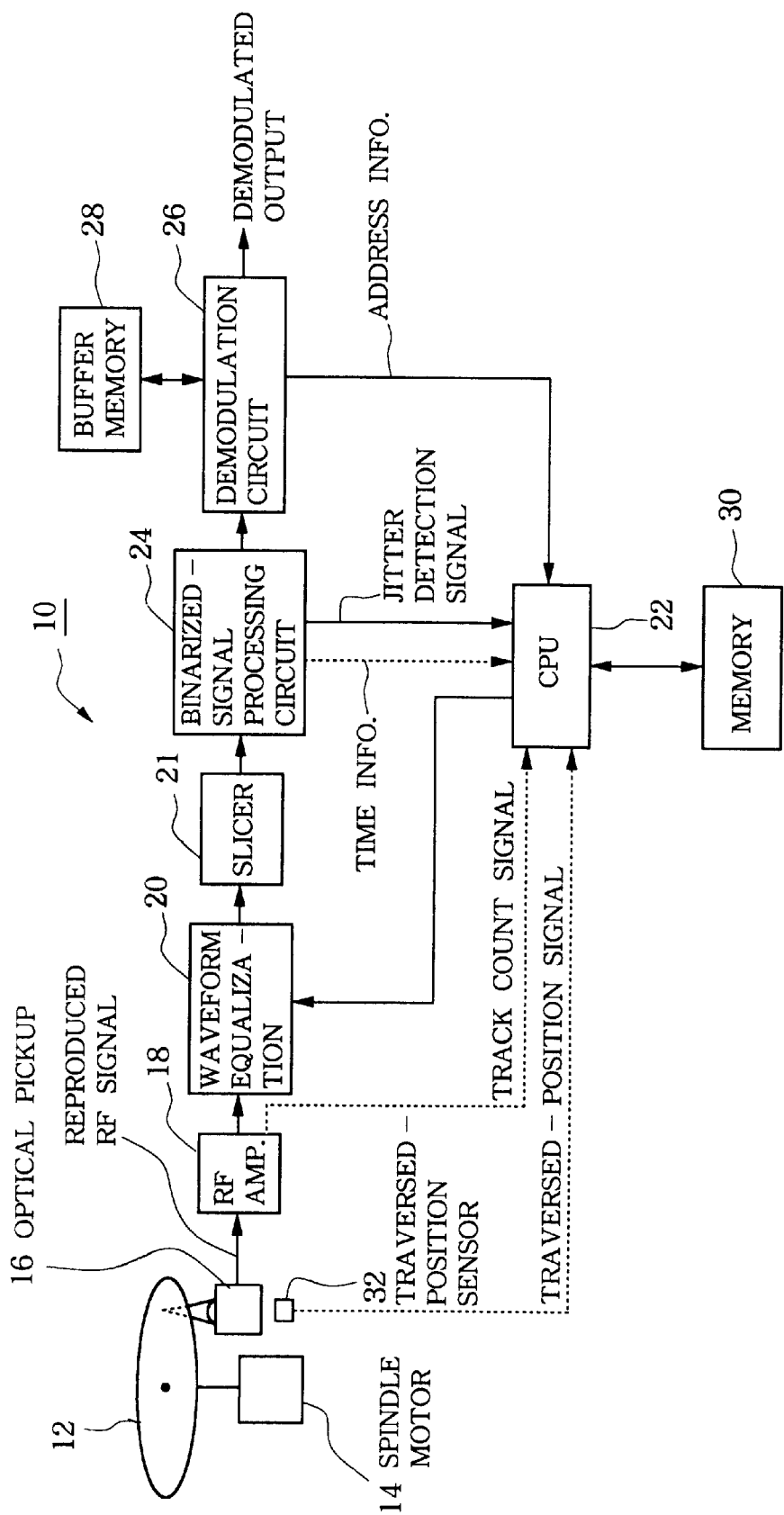
FIG. 1 is a block diagram showing an exemplary overall setup of an optical disk reproduction apparatus, such as a DVD player, in accordance with a first embodiment of the present invention, which is applied to reproduction of a CLV optical disk at a constant angular velocity.

Description will be made about a first embodiment of the present invention which is applied, for example, to a case where a CLV optical disk is reproduced at a constant angular velocity. FIG. 1 is a block diagram showing an exemplary overall setup of an optical disk reproduction apparatus, such as a DVD player, to which the present invention is applied. In the optical disk reproduction apparatus 10 of FIG. 1, an optical disk 12, such as a DVD, having information recorded at a constant linear velocity is driven via a spindle motor 14 to rotate at a constant angular velocity so that the recorded information is read out by an optical pickup 16. Because the information recorded at the constant linear velocity is read out at the constant angular velocity, the frequency band of reproduced RF signals output from the optical pickup 16 is lower in inner circumferential regions of the optical disk 12 than in outer circumferential region. Each of the reproduced RF signals is amplified via an RF amplifier 18 and waveform-equalized via a waveform equalization circuit 20 that comprises a variable equalization circuit such as a transversal filter or CR-type variable filter. Waveform equalization characteristics of the waveform equalization circuit 20 are controlled by a CPU 22. Waveform-equalization-characteristic adjustment parameters where the waveform equalization circuit 20 comprises the transversal filter are a delay time and addition coefficient, while waveform-equalization-characteristic adjustment parameters where the waveform equalization circuit 20 comprises the CR-type variable filter are a cutoff frequency (i.e., boost frequency) and boost amount. The reproduced RF signal having been waveform-equalized by the circuit 20 is binarized by a slicer 21. Binarized-signal processing circuit 24 reproduces a clock pulse signal from the binarized signal and then uses the reproduced clock pulse signal to re-sample the binarized signal, so as to provide a binarized signal synchronized with the reproduced clock pulse signal. Also, the binarized-signal processing circuit 24 detects a phase difference between the binarized signal before the re-sampling and the reproduced clock pulse signal and smoothes the detected phase difference to provide the same as a jitter detection signal. The binarized signal having been re-sampled by the binarized-signal processing circuit 24 is temporarily stored into a buffer memory 28 and then delivered to a data demodulation circuit 26, where the signal is subjected to a data demodulation process, such as an EFM demodulation process, and an error correction process. The data demodulation circuit 26 also outputs address information read out from a reproduced location of the optical disk 12.

Once the optical disk 12 is inserted or loaded into the optical disk reproduction apparatus 10, the CPU 22, prior to actual reproduction of the optical disk 12, positions the optical pickup 16 at the innermost and outermost locations of a signal recording area of the disk 12 and then test-reproduces the optical disk 12 while rotating the disk 12 at the same constant angular velocity as will be used for the subsequent actual or non-test reproduction of the disk 12. In the test reproduction, the CPU 22 adjusts the waveform-equalization-characteristic adjustment parameters of the waveform equalization circuit 20 while detecting jitter by means of the jitter detection signal, and thereby determines respective optimal values or settings of the adjustment parameters capable of providing an optimal (e.g., minimal) jitter level. Then, 1) information indicative of a radial position or address, on the optical disk 12, of the test-reproduced innermost and settings of the waveform-equalization-characteristic adjustment parameters having been optimized for that radial position, and 2) information indicative of a radial position, on the optical disk 12, of the test-reproduced outermost location and settings of the waveform-equalization-characteristic adjustment parameters having been optimized for that radial position is stored into a memory 30. In the actual reproduction of the optical disk 12, the CPU 22 predicts optimal settings of the waveform-equalization-characteristic adjustment parameters on the basis of the optimal settings of the waveform-equalization-characteristic adjustment parameters stored in the memory 30, and sets the waveform-equalization-characteristic adjustment parameters to the thus-predicted optimal settings whenever necessary. For example, the CPU 22 calculates (predicts) optimal settings of the waveform-equalization-characteristic adjustment parameters for a radial position, on the optical disk 12, of each individual reproduced location, assuming that the optimal settings of the waveform-equalization-characteristic adjustment parameters vary linearly in the inner-to-outer direction of the optical disk 12, and sets the thus-predicted optimal settings into the waveform equalization circuit 20. At that time, the information indicative of the radial position of each location to be reproduced via the optical pickup may be determined arithmetically on the basis of address information contained in the demodulated data, or on the basis of information indicative of a radial position, relative to the disk 12, of the optical pickup 16 detected via a traversed-position sensor 32, a count indicated by a track count signal (corresponding to a particular number of tracks having been counted for a section from the innermost location to the currently reproduced location of the disk 12), a ratio of a linear velocity at the currently reproduced location to a linear velocity at the innermost location of the optical disk 12 (e.g., regarding a time length of one cycle of a particular signal such as a 3T, 11T, 14T or the like). Note that the optimal values or settings of the waveform-equalization-characteristic adjustment parameters for each individual reproduced location may be predicted by setting three or more radial locations to be test-reproduced (i.e., "testing radial locations") and then using a characteristic control curve obtained by connecting respective values of the waveform-equalization-characteristic adjustment parameters optimized for the thus-set testing radial locations.

Figure 2:
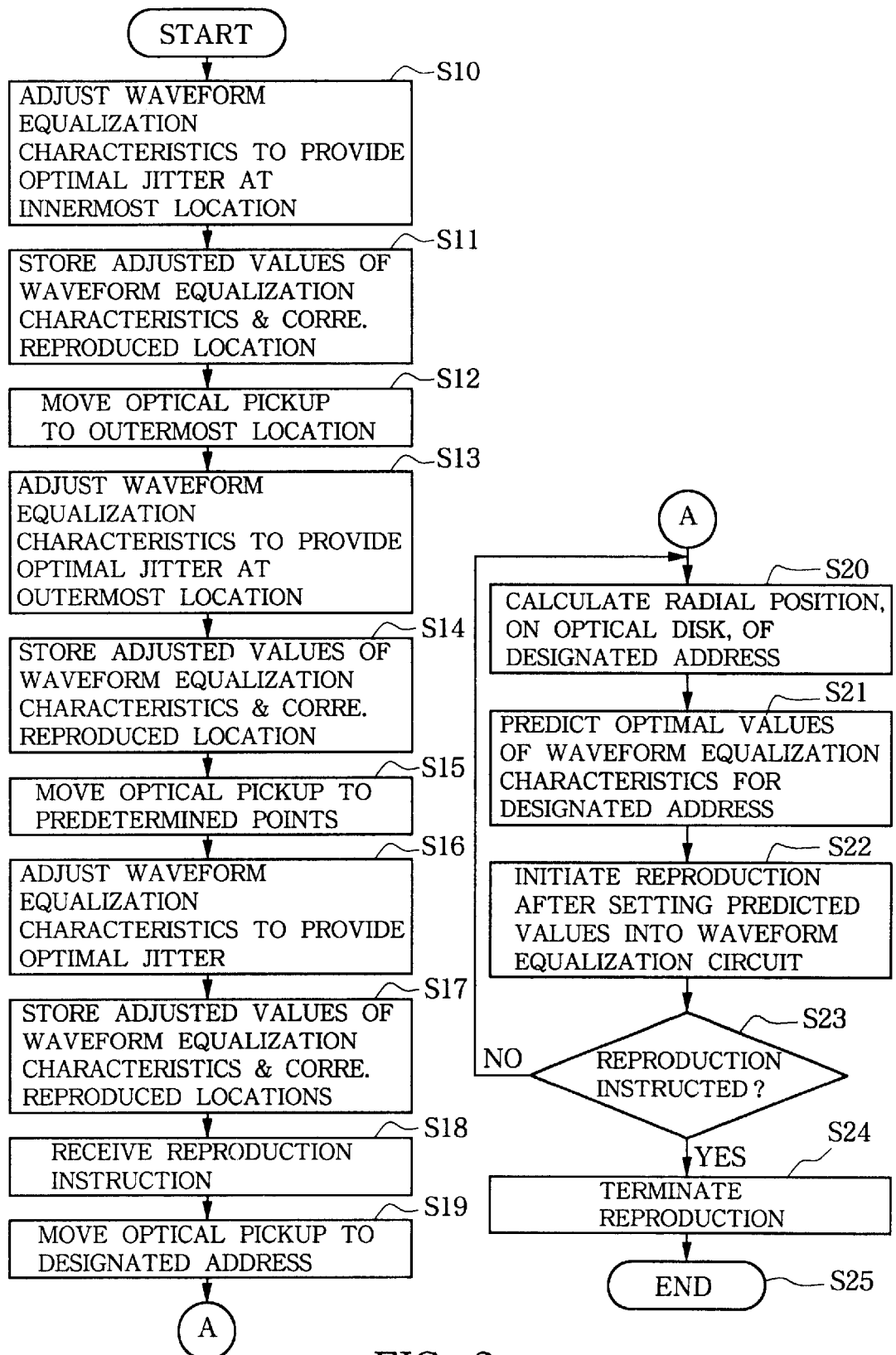
FIG. 2 is a flow chart showing an example of a process performed in the optical disk reproduction apparatus of FIG. 1 for modifying waveform-equalization-characteristic adjustment parameters.

FIG. 2 is a flow chart showing an exemplary sequence of control performed by the CPU 22. Once insertion of the optical disk 12 into the reproduction apparatus 10 is detected, the disk 12 is driven to rotate at the same constant angular velocity as used for the subsequent actual or non-test reproduction, and the optical pickup 16 is positioned at or close to the innermost location in the signal recording area of the disk 12 and then test reproduction is performed with respect to the innermost or near-innermost location of the optical disk 12. Then, at step S10, the waveform-equalization-characteristic adjustment parameters of the waveform equalization circuit 20 are modified or adjusted to respective optimal values or settings capable of providing an optimal (e.g., minimal) jitter level; specifically, the delay time and addition coefficient are modified in the case where the waveform equalization circuit 20 comprises the transversal filter, but the cutoff frequency (i.e., boost frequency) and boost amount are modified in the case the waveform equalization circuit 20 comprises the CR-type variable filter. The thus-adjusted values or settings of the waveform-equalization-characteristic adjustment parameters and information indicative of the corresponding reproduced location of the optical disk 12 are stored into the memory 30, at step S11. Then, with the disk's rotation kept at the above-mentioned constant angular velocity, the optical pickup 16 is moved and positioned at or close to the outermost location in the signal recording area of the disk 12 and then test reproduction is performed with respect to the outermost or near-outermost location of the optical disk 12, at step S12, in a similar manner to the above-mentioned. Then, at step S13, the waveform-equalization-characteristic adjustment parameters of the waveform equalization circuit 20 are adjusted to respective optimal values capable of providing an optimal (e.g., minimal) jitter level. The thus-adjusted settings of the waveform-equalization-characteristic adjustment parameters and information indicative of the corresponding reproduced location are stored into the memory 30, at step S14.

In the case where the test reproduction is performed with respect to three or more testing radial locations of the optical disk 12, the optical pickup 16 is moved to and positioned at predetermined points between the innermost and outermost locations of the disk 12 while keeping the disk rotation at the above-mentioned constant angular velocity, at step S15. The "predetermined points" are, for example, equally-spaced-apart points defined by dividing a section between the innermost and outermost locations of the disk 12 into n (n is an arbitrary integral number) equal parts or a location displaced a predetermined amount from the innermost location toward the outer peripheral edge of the disk 12. Then, the test reproduction is performed with respect to the individual testing radial locations in generally the same manner as described above, so that the waveform-equalization-characteristic adjustment parameters of the waveform equalization circuit 20 are adjusted to respective optimal values capable of providing an optimal (e.g., minimal) jitter level at step S16. The thus-adjusted values of the waveform-equalization-characteristic adjustment parameters and information indicative of the corresponding reproduced locations are stored into the memory 30, at step S17. This way, the test reproduction is completed, and thus the optical disk reproduction apparatus 10 is now ready for the actual or non-test reproduction of the optical disk 12.

Once the user instructs the actual reproduction of the optical disk 12 at step S18, the disk 12 is driven to rotate at the above-mentioned constant angular velocity and the optical pickup 16 is moved to a designated address at step S19. Then, a radial position, on the optical disk 12, corresponding to the designated address is calculated at step S20, and arithmetic operations are carried out, at step S21, to predict optimal values of the waveform-equalization-characteristic adjustment parameters for that designated address, to which the optical pickup 16 has been moved, on the basis of the respective optimal values obtained previously through the test reproduction. Then, the actual reproduction is initiated at step S22 after setting the waveform-equalization-characteristic adjustment parameters to the predicted values. During the actual reproduction, arithmetic operations are carried out to sequentially predict optimal values of the waveform-equalization-characteristic adjustment parameters in response to a varying radial position on the optical disk 12 to be reproduced and change the waveform-equalization-characteristic adjustment parameters to the predicted values, at steps S23 and S20–S22. Once termination of the reproduction is instructed as determined at step S23, the reproduction is brought to an end at step S24, so that the control sequence is terminated at step S25.

Figure 3:
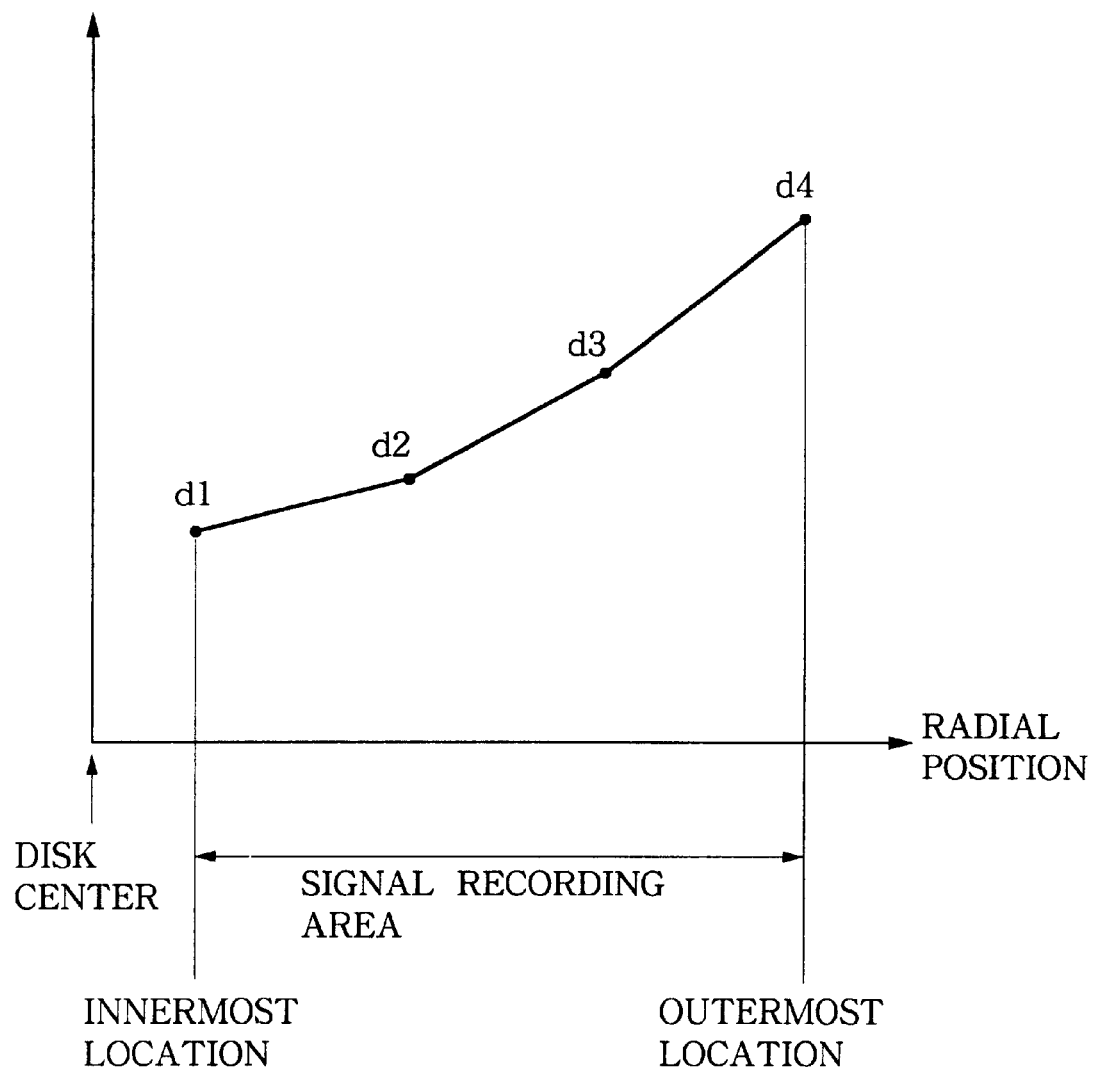
FIG. 3 is a conceptual diagram explanatory of an exemplary manner in which arithmetic operations are performed to sequentially predict optimal values of the waveform-equalization-characteristic adjustment parameters in the optical disk reproduction apparatus of FIG. 1.

Next, an exemplary manner of performing the arithmetic operations to sequentially predict optimal values of the waveform-equalization-characteristic adjustment parameters is explained with reference to FIG. 3. In FIG. 3, the horizontal axis or abscissa represents the disk's radial position, while the vertical axis or ordinate represents the adjusted value of the waveform-equalization-characteristic adjustment parameter. "d1"–"d4" represent optimal values of the waveform-equalization-characteristic adjustment parameter that have been determined by the test reproduction performed with respect to the innermost location, outermost location and two equally-spaced intermediate locations defined by dividing a section between the innermost and outermost locations of the disk 12 into three equal parts. Line connecting the optimal values d1–d4 represents an optimal-value prediction characteristic of the parameter in question. In the actual reproduction, an optimal value or setting of the waveform-equalization-characteristic adjustment parameter is arithmetically predicted from the prediction characteristic in accordance with a radial position, on the optical disk, of each position to be reproduced via the optical pickup, and the thus-predicted optimal value is set into the waveform equalization circuit 20. It should be appreciated, however, that the arithmetical prediction of the optimal value may be performed using any other suitable scheme than the above-described linear prediction.

Embodiment 2

Figure 4:
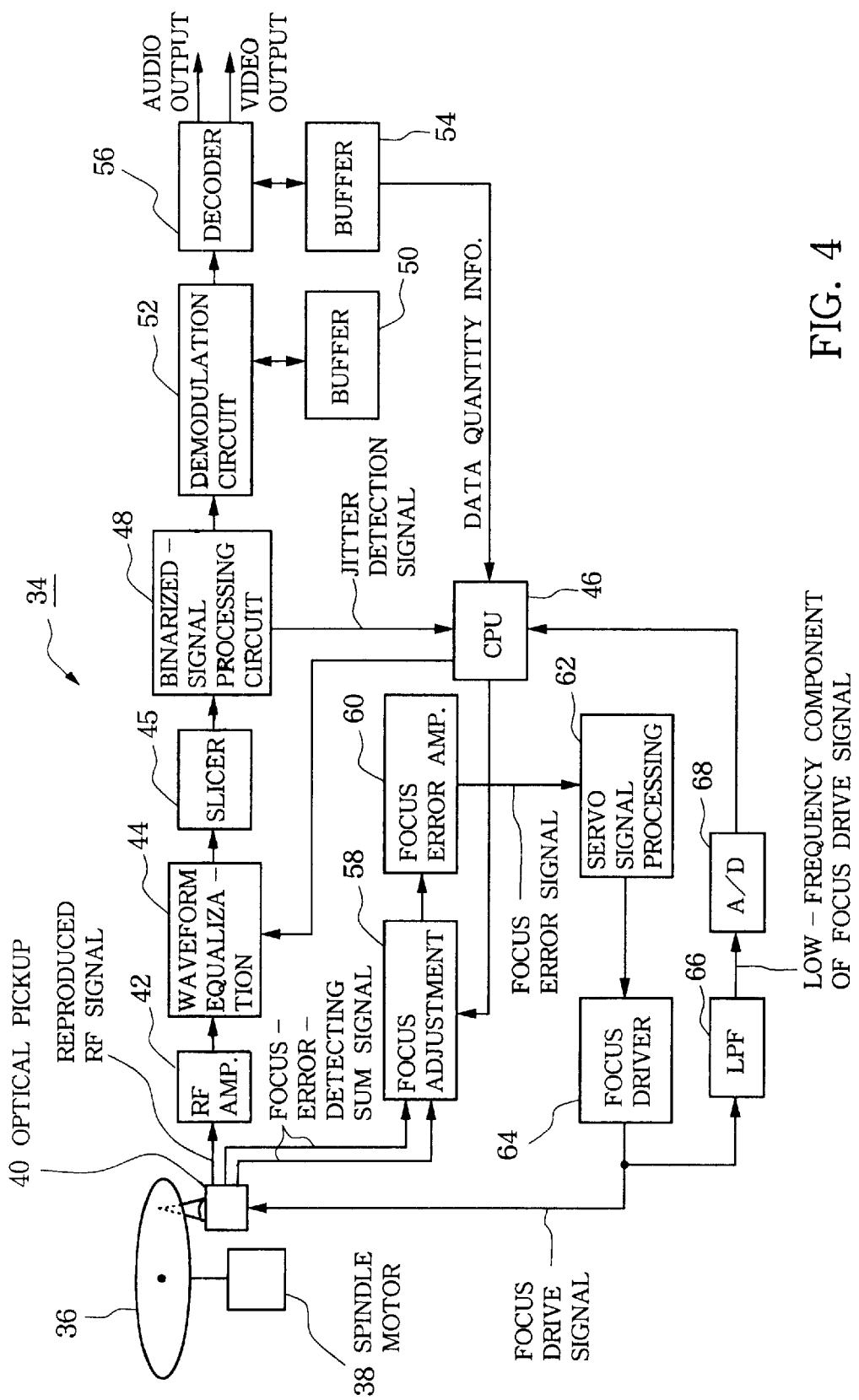
FIG. 4 is a block diagram showing an exemplary overall setup of an optical disk reproduction apparatus in accordance with a second embodiment of the present invention, which is arranged to appropriately deal with a radially-warped optical disk.

Second embodiment of the present invention will now be described, which can be suitably used for reproduction of a warped optical disk. FIG. 4 is a block diagram showing an exemplary overall setup of an optical disk reproduction apparatus, such as a DVD player, in accordance with the second embodiment of the present invention. In the optical disk reproduction apparatus 34 of FIG. 4, an optical disk 36, such as a DVD disk, having information recorded at a constant linear velocity is driven via a spindle motor 38 to rotate at a constant angular velocity so that the recorded information is read out by an optical pickup 40. Each reproduced RF signal output from the optical disk 36 (i.e., signal representing a sum of outputs from all of four divided light-receiving elements constituting the four-quadrant optical pickup 40) is amplified via an RF amplifier 42 and waveform-equalized via a waveform equalization circuit 44 that comprises a variable equalization circuit such as a transversal filter or CR-type variable filter. Waveform equalization characteristics of the waveform equalization circuit 44 are controlled by a CPU 46. Waveform-equalization-characteristic adjustment parameters where the waveform equalization circuit 44 comprises the transversal filter are a delay time and addition coefficient, while waveform-equalization-characteristic adjustment parameters where the waveform equalization circuit 44 comprises the CR-type variable filter are a cutoff frequency (i.e., boost frequency) and boost amount. The reproduced RF signal having been waveform-equalized by the circuit 44 is binarized by a slicer 45. Binarized-signal processing circuit 48 reproduces a clock pulse signal from the binarized signal and then uses the reproduced clock pulse signal to re-sample the binarized signal, so as to provide a binarized signal synchronized with the reproduced clock pulse signal. Also, the binarized-signal processing circuit 24 detects a phase difference between the binarized signal before the re-sampling and the reproduced clock pulse signal and smoothes the detected phase difference to provide the same as a jitter detection signal. The binarized signal having been re-sampled by the binarized-signal processing circuit 48 is temporarily stored into a buffer memory 50 and then delivered to a data demodulation circuit 52, where the signal is subjected to a data demodulation process, such as an EFM demodulation process, and an error correction process. Then, the demodulated and error-corrected signal is stored into a buffer memory 54, and it is output after being decoded via a decoder 56 into audio and video signals.

Two focus-error-detecting signals (each indicative of the sum of output signals from a pair of the diagonally-disposed light-receiving elements) output from the optical pickup 40 are sent to a focus adjustment circuit 58, where they are subjected to a focus adjustment process such as jitter adjustment as will be later described in detail. Focus error amplifier 60, following the focus adjustment circuit 58, generates a focus error signal based on a calculated difference between the two focus-error-detecting signals. The focus error signal generated by the focus error amplifier 60 is subjected to processing, such as phase adjustment, by a servo signal processing circuit 62. Focus driver 64 drives a focus actuator within the optical pickup 40 to eliminate the focus error.

Figure 5A:
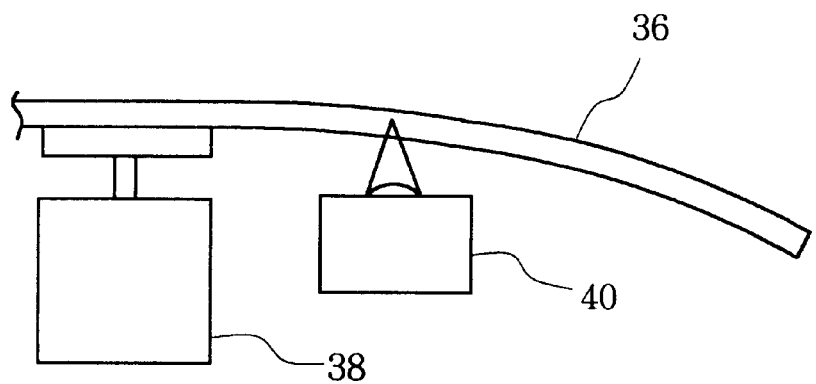
FIGS. 5A and 5B are diagrams showing exemplary relationship between the radial warp of the optical disk and a low-frequency component level of a focus drive signal.
Figure 5B:
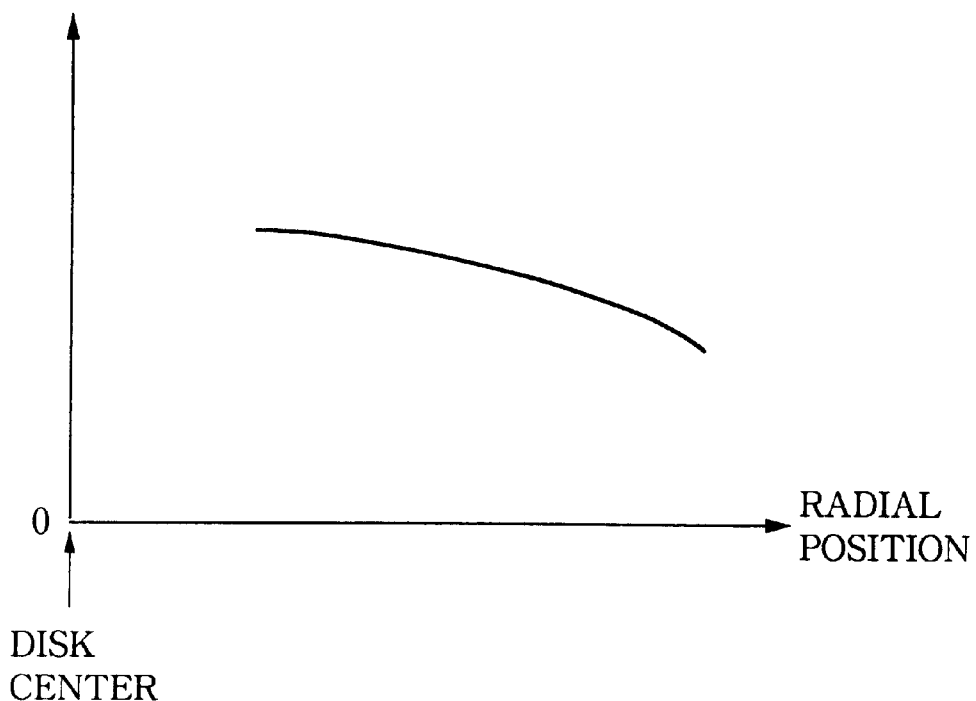

Low-pass filter (LPF) 66 extracts a low-frequency component (D.C. component) out of a focus drive signal output from the focus driver 64. FIGS. 5A and 5B show exemplary relationship between the radial warp of the optical disk 36 and the low-frequency component level of the focus drive signal. Where the optical disk 36 is radially warped in such a manner that it bends gradually from its center downward (i.e., in a direction toward the optical pickup 40) as shown in FIG. 5A, the low-frequency component level of the focus drive signal decreases gradually as the reproduction progresses toward the outer periphery of the optical disk 36 as shown in FIG. 5B. Referring back to FIG. 4, an output from the low-pass filter 66 is converted by an A/D converter 68 into a digital signal to be then passed to the CPU 46. Prior to or at the beginning of the reproduction, the CPU 46 detects a low-frequency component level of the focus drive signal generated with respect to the innermost location of the optical disk 36 and stores the detected low-frequency component level into its internal memory 30.

Then, in the actual reproduction of the optical disk 36, the CPU 46 evaluates a difference between a low-frequency component level of the focus drive signal detected with respect to each reproduced location of the optical disk 36 and the memory-stored low-frequency component level with respect to the innermost location. When the evaluated difference exceeds a predetermined threshold value, the CPU 46 performs a jitter adjustment process at predetermined timing. Specifically, the jitter adjustment process includes the focus adjustment process, i.e. either one or both of the focus balance adjustment and focus offset adjustment, performed by the focus adjustment circuit 58, and the adjustment of the waveform equalization characteristics of the waveform equalization circuit 44. These adjustments are carried out by modifying the individual adjustment parameter values while detecting a jitter level by means of the jitter detection signal and determining respective optimal values of the adjustment parameters capable of providing an optimal (e.g., minimal) jitter level. For this purpose, the focus adjustment process is first carried out and then the waveform equalization characteristic adjustment is carried out upon termination of the focus adjustment process.

The timing for performing the jitter adjustment process can be set to either of the following:

(A) when the reproduction has been ceased in response to a user's operation (e.g., operation to temporarily stop or pause the reproduction), disk authoring (i.e., wait-for-input state where a menu screen is displayed to await a user's selection), or the like; and (B) when, during the course of the reproduction, a time (T) left before a time point when track buffers 50 and 54 are expected to get empty has become greater than a time (t) required for the jitter adjustment (i.e., T>t).

If the timing suggested at item (B) above is set, the jitter adjustment process can be performed, with the readout operation of the optical pickup 40 suspended, without breaking the reproduced output (i.e., while maintaining the continuity of the reproduction). In this case, the time (T) left before the time point when the track buffers 50 and 54 are expected to get empty can be calculated on the basis of a total quantity of data currently remaining in the track buffers 50 and 54 and average data transfer rate at the time in question. Further, to allow the condition of item (B) to be readily satisfied whenever it is determined during the reproduction that the jitter adjustment process is necessary, it will be very advantageous to perform such control as to compulsorily increase the data quantity in the track buffers 50 and 54 (e.g., compulsorily fill the track buffers 50 and 54) as by increasing the rotation speed of the optical disk. Increasing the capacity of the track buffers 50 and 54 will also be effective for that purpose. Once there arises a need or cause for suspending the jitter adjustment process, such as when reproduction of animation (moving picture) or sound is to be initiated in response to a user's operation or disk authoring or when the jitter adjustment process has taken a longer time than expected and thus the track buffers 50 and 54 have got near empty to the extent that the continuity of the reproduction can not be maintained any longer, the jitter adjustment process is halted and then the optical pickup 40 is caused to resume its readout operation using the previous modified values that was being used before the initiation of the jitter adjustment process. Then, when all conditions for again performing the jitter adjustment process has been satisfied, the jitter adjustment process is resumed.

It should be appreciated that the jitter adjustment process can be performed when a jitter level represented by the jitter detection signal has exceeded a predetermined threshold value, in addition to being performed on the basis of the low-frequency component level of the focus drive signal as described above. Further, where every optical disk to be reproduced by the optical disk reproduction apparatus 34 is of a same type (e.g., where every optical disk to be reproduced is of the CD standard) and thus the low-frequency component level of the focus drive signal generated with respect to the innermost location of the disk can be considered substantially uniform for each of the optical disks, the jitter adjustment process may be performed at predetermined timing, without the need for storing, in the memory 30, the low-frequency component level of the focus drive signal generated with respect to the innermost location and calculating a difference between the low-frequency component level of the focus drive signal detected with respect to each reproduced location of the optical disk 36 and the memory-stored low-frequency component level; that is, in this case, the jitter adjustment process may be performed only on the basis of the low-frequency component level of the focus drive signal detected with respect to each reproduced location of the optical disk 36, i.e. when the low-frequency component level has exceeded a predetermined threshold value. Further, where the optical disk reproduction apparatus 34 is capable of reproducing a plurality of types of optical disks (e.g., optical disks of the CD standard and DVD standard) that differ in substrate's thickness and thus the low-frequency component level of the focus drive signal generated with respect to the disk's innermost location differs between the disk types, the threshold value of the low-frequency component level of the focus drive signal is preset for each of the disk types so that when a particular optical disk is inserted into the reproduction apparatus 34, one of the threshold values is selected in accordance with the type of the inserted optical disk. Namely, in this case too, the jitter adjustment process may be performed at predetermined timing only on the basis of the low-frequency component level of the focus drive signal detected with respect to each reproduced location of the optical disk 36, i.e. when the low-frequency component level has exceeded the selected predetermined threshold value, without the need for storing, in the memory, the low-frequency component level of the focus drive signal generated with respect to the disk's innermost location and calculating a difference between the low-frequency component level of the focus drive signal detected with respect to each reproduced location of the optical disk 36 and the memory-stored low-frequency component level.

Figure 6:
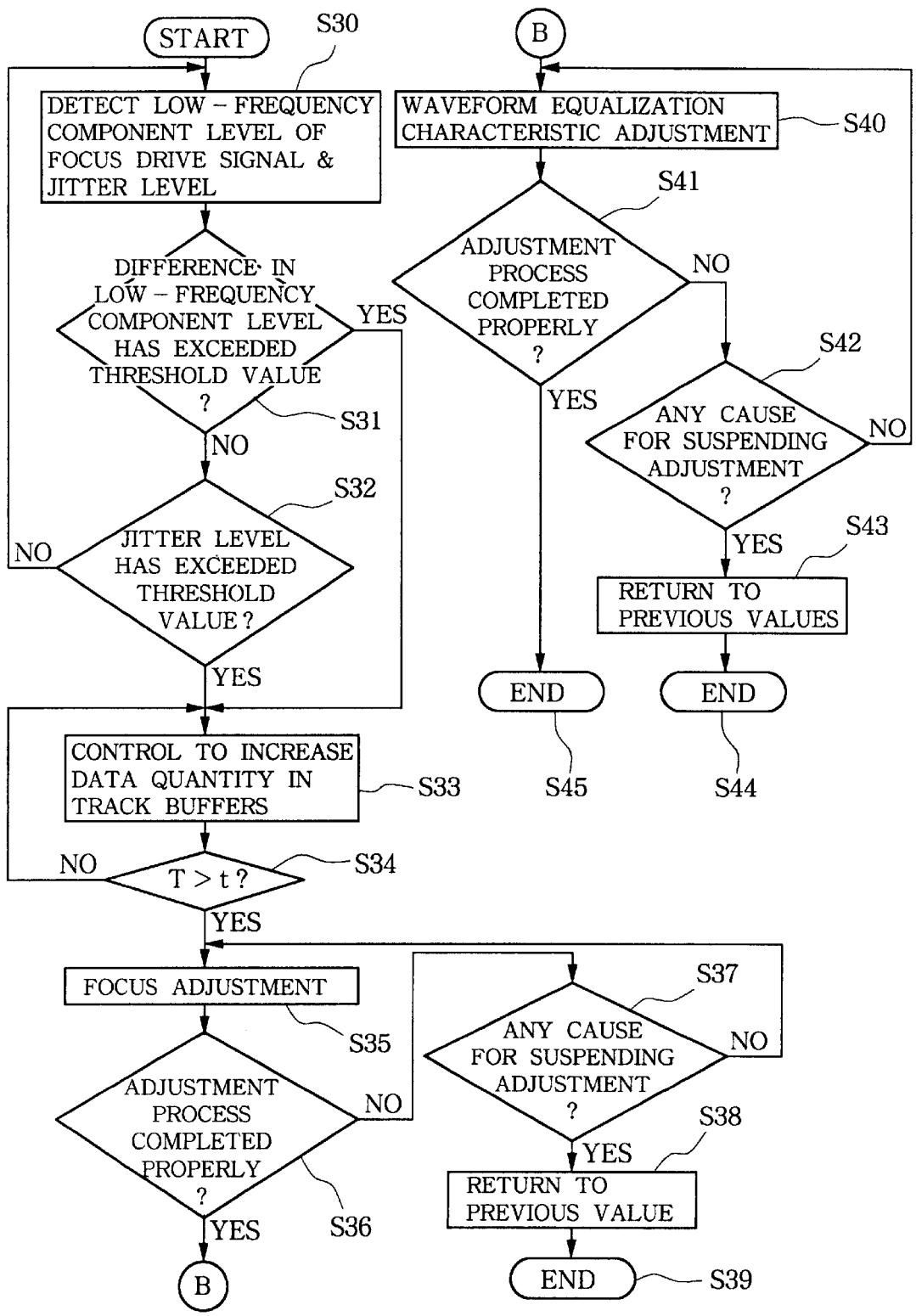
FIG. 6 is a flow chart showing an exemplary step sequence of a jitter adjustment process performed in the optical disk reproduction apparatus of FIG. 4.

FIG. 6 is a flow chart showing an exemplary sequence of jitter adjustment control performed by the CPU 46 of FIG. 4. The CPU 46 detects the low-frequency component level of the focus drive signal and jitter level with respect to the currently reproduced location of the optical disk 36, at step S30. Then, at step S31, a determination is made as to whether the difference between the low-frequency component level of the focus drive signal detected with respect to the currently reproduced location of the optical disk 36 and the memory-stored low-frequency component level detected with respect to the innermost location of the optical disk 36 has exceeded the predetermined threshold value. Also, at step S32, a determination is made as to whether the detected jitter level has exceeded the predetermined threshold value. When either the difference in the low-frequency component level or the detected jitter level has exceeded the corresponding threshold value as determined at step S31 or S32, the CPU 46 carries out the control to increase the data quantity in the track buffers 50 and 54 at step S33. Then, a determination is made at step S34 as to whether the time (T) left before the time point when the track buffers 50 and 54 are expected to get empty has become greater than the time (t) required for the jitter adjustment (i.e., T>t). If answered in the affirmative at step S34, the readout operation of the optical disk by the optical pickup 40 is suspended to perform the focus adjustment process at step S35. The focus adjustment process is carried out by adjusting the focus balance (e.g., performing a subtraction between the two focus-error-detecting signals to thereby adjust a ratio therebetween), determining respective optimal values of the individual adjustment parameters capable of providing an optimal (e.g., minimal) jitter and setting the adjustment parameters to the determined optimal values or settings. The focus offset adjustment may be performed before or after the focus balance adjustment. Specifically, the focus offset adjustment is effected by modifying an offset value for focus error detection, i.e. adding or subtracting the offset value to or from a detected focus error value, to thereby determine and set a modified value capable of providing an optimal (e.g., minimal) jitter.

Then, it is determined at step S36 whether the focus adjustment process has been completed properly. If there has arisen a need or cause for suspending the focus adjustment process as determined at step S37, the adjustment control of FIG. 6 is brought to an end at step S39 after setting the modified value back to the previous value that was being used before initiation of the focus adjustment process at step S38. If, on the other hand, the focus adjustment process has been completed properly as determined at step S37, the control proceeds to the adjustment of the waveform equalization characteristics at step S40, which is carried out by modifying the waveform-equalization-characteristic adjustment parameters, i.e. the delay time and addition in the case where the waveform equalization circuit 44 comprises the transversal filter but the cutoff frequency (i.e., boost frequency) and boost amount in the case the waveform equalization circuit 44 comprises the CR-type variable filter, to thereby determine optimal values capable of providing an optimal (e.g., minimal) jitter and then setting the waveform-equalization-characteristic adjustment parameters to the optimal values. Then, it is determined at step S41 whether the waveform-equalization-characteristic adjustment process has been completed properly. If there has arisen a need or cause for suspending the waveform-equalization-characteristic adjustment process as determined at step S42, the adjustment control of FIG. 6 is brought to an end at step S44 after setting the modified values back to the previous values that were being used before initiation of the waveform-equalization-characteristic adjustment process at step S43. When the waveform-equalization-characteristic adjustment process has been completed properly as determined at step S41, the adjustment control of FIG. 6 is directly brought to an end at step S45.

Embodiment 3

As a third embodiment of the present invention, the function of the prediction-based focus adjustment in the first embodiment of FIG. 1 can be added to the second embodiment of FIG. 4. Namely, according to the third embodiment, the focus adjustment circuit, i.e. either one or both of the focus balance adjustment and focus offset adjustment, is adjusted so as to provide an optimal jitter level, and the waveform-equalization-characteristic adjustment parameters of the waveform equalization circuit, with the focus thus adjusted, are modified to further optimize the jitter level. Then, the respective modified values or settings of the focus adjustment and waveform-equalization-characteristic adjustment parameters for each reproduced location of the optical disk are stored into memory, and optimal values or settings of the focus adjustment and waveform-equalization-characteristic adjustment parameters are predicted arithmetically on the basis of the memory-stored modified values, in accordance with the radial position, on the optical disk, of the reproduced location, so that the focus adjustment and waveform-equalization-characteristic adjustment parameters are set to the predicated optimal settings whenever necessary.

Embodiment 4

Whereas the first embodiment of FIG. 1 has been described as performing the test reproduction with respect to a plurality of testing radial locations on the optical disk, the test reproduction may be performed more simply using only one testing radial location on the optical disk, as a fourth embodiment of the present invention. Namely, according to the fourth embodiment, the test reproduction is performed with respect to only one testing radial location (e.g., the innermost or near-innermost location) on the optical disk prior to the actual or non-test reproduction of the disk. Then, the waveform-equalization-characteristic adjustment parameters of the waveform equalization circuit are modified to respective optimal values capable of providing an optimal (e.g., minimal) jitter level of the reproduced RF signal at that location, and the optimal values are stored into memory. In the actual reproduction, either one of the waveform-equalization-characteristic adjustment parameters, e.g. only the cutoff frequency, is set, in accordance with the radial position, on the optical disk, of each reproduced location, to optimal values, whenever necessary, that are predicted on the basis of a variation, in the linear velocity, relative to that at the test-reproduced location—the variation in the linear velocity can be determined arithmetically on the basis of a difference between radial positions, on the optical disk, of the test-reproduced location and actual reproduced location. For this purpose, the cutoff frequency may be changed in proportion to the variation in the linear velocity.

What is claimed is:

1. An optical disk reproduction apparatus comprising:
    an optical pickup arranged to read out recorded information from an optical disk;
    a waveform equalization section arranged to perform a waveform equalization process on a reproduced RF signal that is generated on the basis of the recorded information read out by said optical pickup;
    a jitter detection section arranged to detect jitter of the reproduced RF signal having been subjected to the waveform equalization process;
    a storing section arranged to store waveform equalization characteristics of the waveform equalization section; and
    a control section arranged to:
        perform test reproductions on the optical disk at a plurality of radial locations of the optical disk prior to actual reproduction of the optical disk;
        adjust a waveform equalization characteristic of said waveform equalization section to minimize jitter of the reproduced RF signal detected by said jitter detection section at each of the radial locations of the optical disk;
        store the waveform equalization characteristics adjusted at the each of the radial locations of the optical disk; and
        during the actual reproduction of the optical disk, adjust the waveform equalization characteristic of said waveform equalization section to a setting that is predicted on the stored waveform equalization characteristics and in accordance with a radial position on the optical disk, at each location to be reproduced via said optical pickup.

2. An optical disk reproduction apparatus as claimed in claim 1 which further comprises a focus adjustment section arranged to perform a focus adjustment process for adjusting either one or both of a focus balance and focus offset by use of two focus-error-detecting signals generated on the basis of the recorded information read out by said optical pickup, and
    wherein said control section, during the test reproduction, adjusts said focus adjustment section to an optimal setting at each of the testing radial locations, prior to adjustment of the waveform equalization characteristic, so as to optimize the jitter of the reproduced RF signal detected by said jitter detection section, and wherein said control section, during the actual reproduction, performs further control to adjust said focus adjustment section to an optimal setting that is predicted, from the optimal setting determined by the test reproduction, in accordance with a radial position, on the optical disk, of each location to be reproduced via said optical pickup.

3. An optical disk reproduction apparatus as claimed in claim 2 wherein said control section stores, into a memory, the optimal setting of said focus adjustment section determined by the test reproduction, and wherein during the actual reproduction, said control section arithmetically predicts an optimal setting of said focus adjustment section, on the basis of the optimal setting of said focus adjustment section stored in said memory, in accordance with the radial position, on the optical disk, of each reproduced location.

4. An optical disk reproduction apparatus as claimed in claim 1 wherein said optical disk is of a type having information recorded at a constant linear velocity and wherein said optical disk is reproduced at a constant angular velocity.

5. An optical disk reproduction apparatus as claimed in claim 1 wherein said control section stores, into a memory, the optimal setting of the waveform equalization characteristic determined by the test reproduction, and wherein during the actual reproduction, said control section arithmetically predicts the optimal setting of the waveform equalization characteristic, on the basis of the optimal setting of the waveform equalization characteristic stored in the memory, in accordance with the radial position, on the optical disk, of each reproduced location.

6. An optical disk reproduction apparatus comprising:
  a rotation control arranged to drive, at a constant angular velocity, an optical disk having information recorded thereon at a constant linear velocity;
  an optical pickup arranged to read out recorded information from the optical disk;
  a waveform equalization section arranged to perform a waveform equalization process on a reproduced RF signal that is generated on the basis of the recorded information read out by said optical pickup;
  a jitter detection section arranged to detect jitter of the reproduced RF signal having been subjected to the waveform equalization process;
  a storing section arranged to store waveform equalization characteristics of the waveform equalization section; and
  a control section arranged to:
    perform a test reproduction on the optical disk at a single radial location of the optical disk prior to actual reproduction of the optical disk;
    adjust a waveform equalization characteristic of said waveform equalization section to minimize jitter of the reproduced RF signal detected by said jitter detection section at the radial location;
    store the waveform equalization characteristic adjusted at the radial location of the optical disk; and
    during the actual reproduction of the optical disk, adjust the waveform equalization characteristic of said waveform equalization section to a setting that is predicted on the stored waveform equalization characteristic and on the basis of variation of linear velocity in accordance with a radial position on the optical disk, at each location to be reproduced via said optical pickup.

7. An optical disk reproduction apparatus as claimed in claim 6 wherein said control section stores, into a memory, the optimal setting of the waveform equalization characteristic determined by the test reproduction, and wherein during the actual reproduction, said control section arithmetically predicts the optimal setting of the waveform equalization characteristic, on the basis of the optimal setting of the waveform equalization characteristic stored in the memory, in accordance with the radial position, on the optical disk, of each reproduced location.

8. An optical disk reproduction apparatus comprising:
  an optical pickup arranged to read out recorded information from an optical disk;
  a waveform equalization section arranged to perform a waveform equalization process on a reproduced RF signal that is generated on the basis of the recorded information read out by said optical pickup;
  a demodulation section arranged to demodulate the reproduced RF signal having been subjected to the waveform equalization process, while cumulatively storing the reproduced RF signal into a buffer memory;
  a jitter detection section arranged to detect jitter of the reproduced RF signal having been subjected to the waveform equalization process;
  a focus servo control section arranged to perform focus servo control by detecting a focus error on the basis of two focus-error-detecting signals that are generated on the basis of the recorded information read out by said optical pickup;
  a focus adjustment section arranged to perform a focus adjustment process for adjusting either one or both of a focus balance and focus offset by use of the two focus-error-detecting signals;
  a low-frequency-component detection section arranged to detect a low-frequency component in a focus drive signal produced by said focus servo control section; and
  a control section arranged to perform control to:
    when it is determined that the low-frequency component in the focus drive signal has exceeded a predetermined threshold value or a difference in the low-frequency component in the focus drive signal between an innermost location and a reproduced location of the optical disk has exceeded a predetermined threshold value and/or the jitter of the reproduced RF signal has exceeded a predetermined threshold value and also on condition that more than a predetermined quantity of data are currently being stored in said buffer memory, suspend readout operation of said optical pickup and adjust said focus adjustment section so as to optimize the jitter of the reproduced RF signal detected by said jitter reproduction section; and
    resume the readout operation of said optical pickup after adjustment to said focus adjustment section.

9. An optical disk reproduction apparatus as claimed in claim 8 wherein said control section performs control, after adjustment to said focus adjustment section, to adjust the waveform equalization characteristic to an optimal setting of said waveform equalization section so as to optimize the jitter of the reproduced RF signal detected by said jitter reproduction section and performs further control to resume the readout operation of said optical pickup after adjustment of the waveform equalization characteristic.

10. An optical disk reproduction apparatus as claimed in claim 8 wherein said control section performs control to suspend the adjustment when a predetermined cause for suspending the adjustment occurs during the course of the adjustment, and then resumes the readout operation of said optical pickup by returning to a previous setting that was being used prior to the adjustment.

* * * * *